United States Patent
Grossmann et al.

(10) Patent No.: US 7,397,150 B2
(45) Date of Patent: Jul. 8, 2008

(54) METHOD AND CONTROL UNIT FOR DRIVING A CONTROL CIRCUIT

(75) Inventors: Alex Grossmann, Gernsbach (DE); Torsten Baumann, Eppingen-Adelshofen (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 10/373,706

(22) Filed: Feb. 27, 2003

(65) Prior Publication Data
US 2003/0184272 A1 Oct. 2, 2003

(30) Foreign Application Priority Data
Feb. 27, 2002 (DE) ............ 102 08 616

(51) Int. Cl.
*H01H 3/26* (2006.01)
(52) U.S. Cl. ............ 307/140
(58) Field of Classification Search ........ 307/138, 307/140; 327/588; 318/293
See application file for complete search history.

(56) References Cited
U.S. PATENT DOCUMENTS

| | | | |
|---|---|---|---|
| 5,428,522 A * | 6/1995 | Millner et al. ............ 363/63 |
| 5,559,416 A | 9/1996 | Hrassky | |
| 5,719,759 A | 2/1998 | Wagner et al. | |
| 6,137,077 A * | 10/2000 | Moro et al. ............ 219/108 |
| 6,333,617 B1 * | 12/2001 | Itabashi et al. ............ 318/801 |
| 6,459,065 B2 | 10/2002 | Watanabe | |
| 6,518,723 B2 | 2/2003 | Oku | |
| 6,867,645 B1 * | 3/2005 | Ansari et al. ............ 327/588 |

OTHER PUBLICATIONS

"Elektrische Antrieb", Bosch Kraftfahrtechnisches Handbuch 22, VDI Verlag, pp. 548-549.
"3966 Dual Full-Bridge PWM Motor Driver", Data Sheets, Allegro Microsystems, Inc., pp. 1-3, 5, 8-12 (1998, 2000).
"L6228 DMOS Driver for Bipolar Stepper Motor", Product Preview, STMicroelectronics, pp. 1-7, 11-12, 14-22 (2002).

* cited by examiner

*Primary Examiner*—Michael J Sherry
*Assistant Examiner*—Daniel Cavallari
(74) *Attorney, Agent, or Firm*—Walter Ottesen

(57) ABSTRACT

A method and a control unit for driving a control circuit (1) are suggested which make possible an improved distribution of the generated power loss. A component (15), especially of a motor vehicle, is driven via at least two outputs (5, 10) of the control circuit (1). Each output (5, 10) is connected pairwise to one of several potentials (40, 45) via controllable switch means (20, 25; 30, 35) and a drive voltage (UA) is formed for the component (15) from a difference between the potentials at the two outputs (5, 10). A pregiven clocked course of the drive voltage (UA) is adjusted by switching more than one of the controllable switch devices (20, 25; 30, 35).

17 Claims, 3 Drawing Sheets

METHOD AND CONTROL UNIT FOR DRIVING A CONTROL CIRCUIT

BACKGROUND OF THE INVENTION

Control circuits are already known which include two outputs for driving a component, especially of a motor vehicle. The component can, for example, be configured as the following: a throttle flap actuator; an exhaust-gas control actuator; a charge-movement actuator; a circulating air actuator in compressor motors; a variable valve drive adjustor or the like. Each output of the control circuit is selectably connectable to an operating voltage potential or a reference potential via a controllable switching means. A drive voltage for the component is formed from a difference between the potentials at the two outputs. A control circuit of this kind can, for example, be realized by a so-called H-bridge circuit as is known, for example, from Motorola as automotive H-bridge driver MC 33186. To drive the control circuit, usually two input signals are used, namely, a pulsewidth-modulated signal for a first input of the control circuit and a constant operational-sign signal (algebraic sign signal) for a second input of the control circuit.

With the known H-bridge circuit, it is possible to drive the component in both possible rotational directions. The H-bridge circuit is either built up discretely or is integrated in an integrated circuit loop. The actuating currents for the components usually lie between 1A and more than 100A. For this reason, the power loss, which is generated at the H-bridge circuit, is critical in two respects. On the one hand, the control circuit must be able to conduct the power loss away to the outside efficiently. On the other hand, highly integrated control circuits and especially those integrated control circuits having areally optimized transistors as controllable switching means have only very little thermal capacity to absorb high loads in a short time.

In both cases, it is desirable to distribute the power loss uniformly in the control circuit or over the integrated circuit. If the control circuit or the H-bridge circuit is built up discretely, then it is desirable to distribute the arising power loss uniformly to the individual controllable circuit means.

SUMMARY OF THE INVENTION

Compared to the above, the method and control unit of the invention for driving a control circuit afford the advantage that a pregiven clocked course of the drive voltage is adjusted by switching more than one of the controllable switch means. In this way, the power loss, which is generated in the driving of the component in the control circuit, can be better distributed to the available controllable switch means and in that way the power loss can be conducted more rapidly to the outside. In this way, a too intense heating of the individual ones of the controllable switch means can be avoided and thereby a destruction thereof prevented. Furthermore, with the improved heat distribution and therefore the reduced heating of the individual switch means, a higher switching frequency can be realized without this leading to a critical heating and, under a given set of circumstances, a destruction of the individual switching means. The heat can be conducted away more efficiently because the heat occurs distributed over several controllable switch means and therefore over a larger area. For this reason, the control circuit can be configured more robustly. Furthermore, costs can be saved because the removal of heat can be realized more simply for the control circuit. With a higher realizable switch frequency of the individual controllable switch means, the connected component, as a rule, is protected because there are less vibration effects. Furthermore, the connected component generates a lower noise level so that the comfort for the driver of a vehicle is increased when the component is a component of a motor vehicle.

It is especially advantageous when the two outputs are connected alternately to one of two potentials via the controllable switch means. The potentials are preferably an operating voltage potential or a reference potential. In this way, the switch operations are distributed uniformly to the controllable switch means so that the power loss, which arises with the switching operations, can likewise be uniformly distributed to these switch means. The removal of heat can be optimized in this manner.

It is especially advantageous when the switching means is driven in such a manner that a periodic signal is generated alternately at both outputs. Correspondingly, the switch signals lie alternately periodically at the outputs of the control unit. In this way, the two outputs of the control unit are alternately driven in two different operating modes which can be switched over utilizing software. In this way, the hardware of the control unit is relieved of load.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
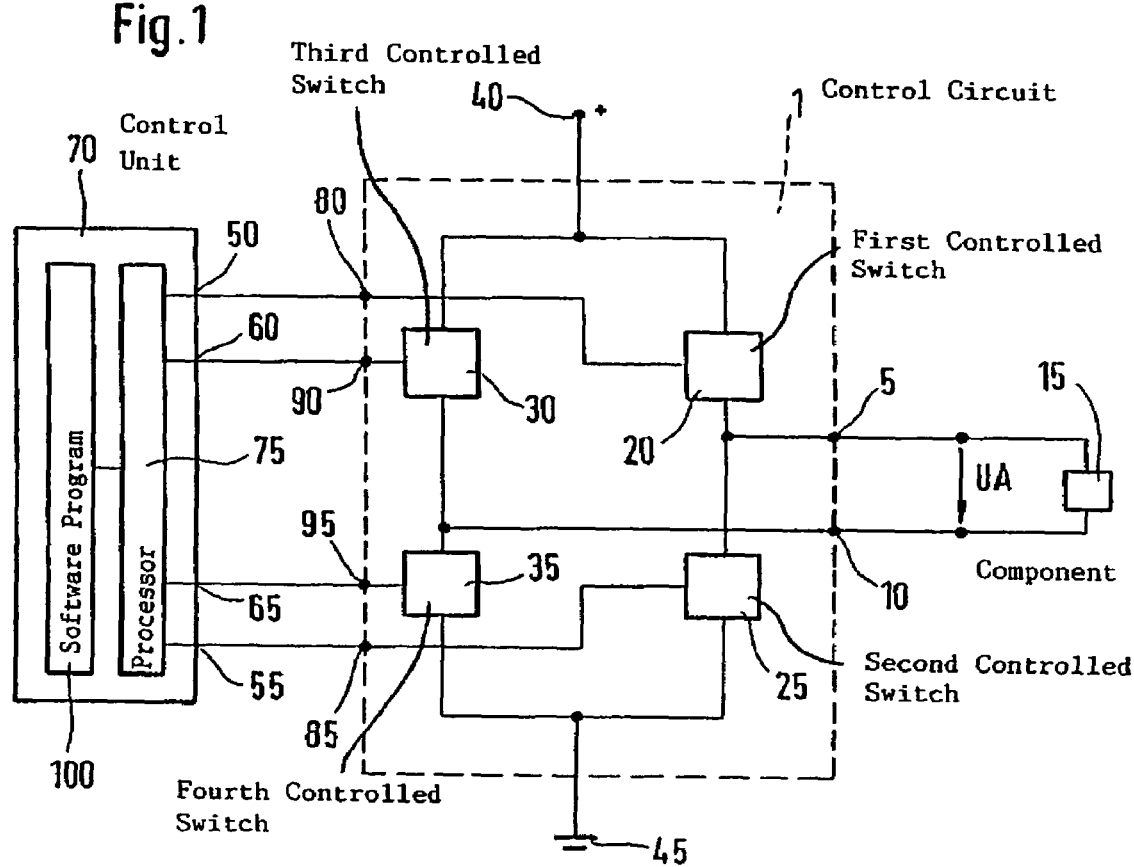
FIG. 1 is a block circuit diagram of a control unit of the invention with connected control circuit and component.

In FIG. 1, reference numeral 1 identifies a control circuit which, in this example, is configured as an H-bridge circuit. The H-bridge circuit includes a first output 5 and a second output 10 for connection to a component 15. The component 15 can, for example, be the component of a motor vehicle. The component 15 can, for example, be configured as the following: a direct-current motor of a throttle flap actuator; an exhaust-gas control actuator; a charge-moving flap actuator; an air circulating actuator in compressor motors; an adjustor of a variable valve drive; or the like. The first output 5 can be connected to an operating voltage potential 40 or a reference potential 45 via a first controllable switch means (20, 25). The second output 10 is connected to the operating voltage potential 40 or the reference potential 45 via a second controlled switch means (30, 35). In this example, the first controllable switch means includes a first controlled switch 20 and a second controlled switch 25. The first output 5 is connectable to the operating voltage potential 40 via a first controlled switch 20 and to the reference potential 45 via a second controlled switch 25. The second controllable switch means (30, 35) include a third controlled switch 30 and a fourth controlled switch 35. The second output 10 can be connected to the operating voltage potential 40 via the third controlled switch 30 and can be connected to the reference potential 45 via the fourth controlled switch 35. The controlled switches (20, 25, 30, 35) can each be configured, for example, as a power transistor or thermistor. The first controllable switch means (20, 25) are derivable via a first input (80, 85) of the control circuit 1. Here, the first input (80, 85) includes a first input terminal 80 for driving the first controlled switch 20 and a second input terminal 85 for driving the second controlled circuit 25. The second controllable switch means (30, 35) are driven via a second input (90, 95) of the control circuit 1. The second input (90, 95) includes a third input terminal 90 for driving the third controlled switch 30 and a fourth input terminal 95 for driving the fourth controlled switch 35. The first input (80, 85) of the control circuit 1 is connected to a first output (50, 55) of a control unit 70. The first output (50, 55) of the control unit 70 includes a first output terminal 50 which is connected to the first input terminal 80 of the control circuit 1 and a second output terminal 55 which is connected to the second input terminal 85 of the control circuit 1. The second input (90, 95) of the control circuit 1 is connected to a second output (60, 65) of the control unit 70. The second output (60, 65) of the control unit 70 includes a third output terminal 60 which is connected to the third input terminal 90 of the control circuit 1 and a fourth output terminal 65 which is connected to the fourth input terminal 95 of the control circuit 1. The control unit 70 includes means 75 for generating control signals at the two outputs (50, 55; 60, 65). The means 75 can be configured as a processor of the control unit 70. Additionally and optionally, the third means 75 can interact with a software program 100.

Figure 4:
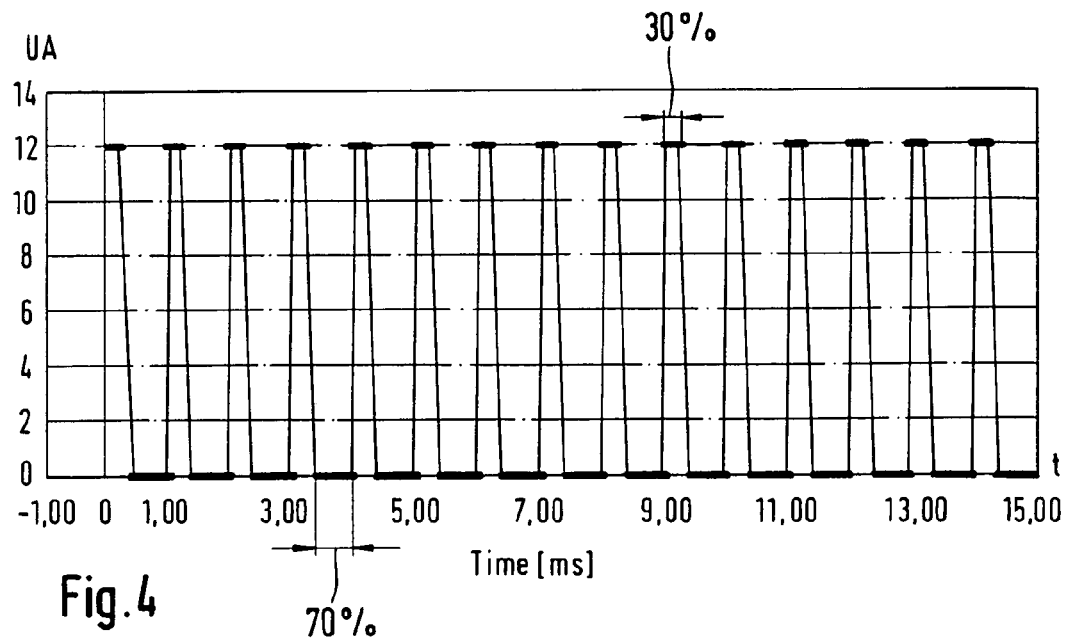
FIG. 4 shows a resulting signal trace for a drive voltage of the connected component; and, FIG. 5 shows a circuit diagram for a conventional drive of the component to be driven.

A drive voltage UA for the component 15 results from the difference between the potential at the first output 5 and the potential at the second output 10 of the control circuit 1. Depending upon the sign of the drive voltage UA, a different rotational direction results for a component configured as a direct-current motor. In the one rotational direction, the second controlled switch 25 and the third controlled switch 30 are switched through and, in the other rotational direction, the first controlled switch 20 and the fourth controlled switch 35 are switched through. A power control of the component 15 can be realized via a drive contact rate in that, for example, the third transistor 30 is continuously switched through and the second transistor 25 is driven only in a clocked manner. Alternatively, the same effect can be achieved when the second transistor 25 is continuously switched through and the third transistor 30 is only driven in a clocked manner. A clocked drive voltage UA, which is realized in this manner is, for example, shown in the signal diagram of FIG. 4 plotted as a function of time (t). The drive clock rate is, for example, 30%. The clock frequency of the drive voltage UA can, for example, lie in the region of 1 kHz, which corresponds to a period duration of 1 ms. In drive clock frequencies, which are, for example, greater than or equal to 500 Hz, a noise reduction can be realized for the component 15, primarily, if the component 15 is configured as a direct-current motor as in this example. To realize these drive clock frequencies, corresponding switch frequencies $\geq$500 Hz of the clocked driven controlled switch or switches are necessary. Losses during the switching operations of the clocked driven controlled switch or switches lead to a heating-up. These losses can then not be minimized by optimization, that is, by shortening the switch times of the clocked driven controlled switch or switches when, because of the short switch times for high currents to be switched, high frequency noise signals are generated and these lead to problems with respect to the electromagnetic compatibility, for example, in a vehicle.

The switch operations, which are necessary for achieving the clocked drive voltage UA, in the control circuit 1 are, in accordance to the invention, distributed to more than one of the controlled switches (20, 25, 30, 35) in order to achieve a uniform distribution of the generated power loss.

Figure 5:
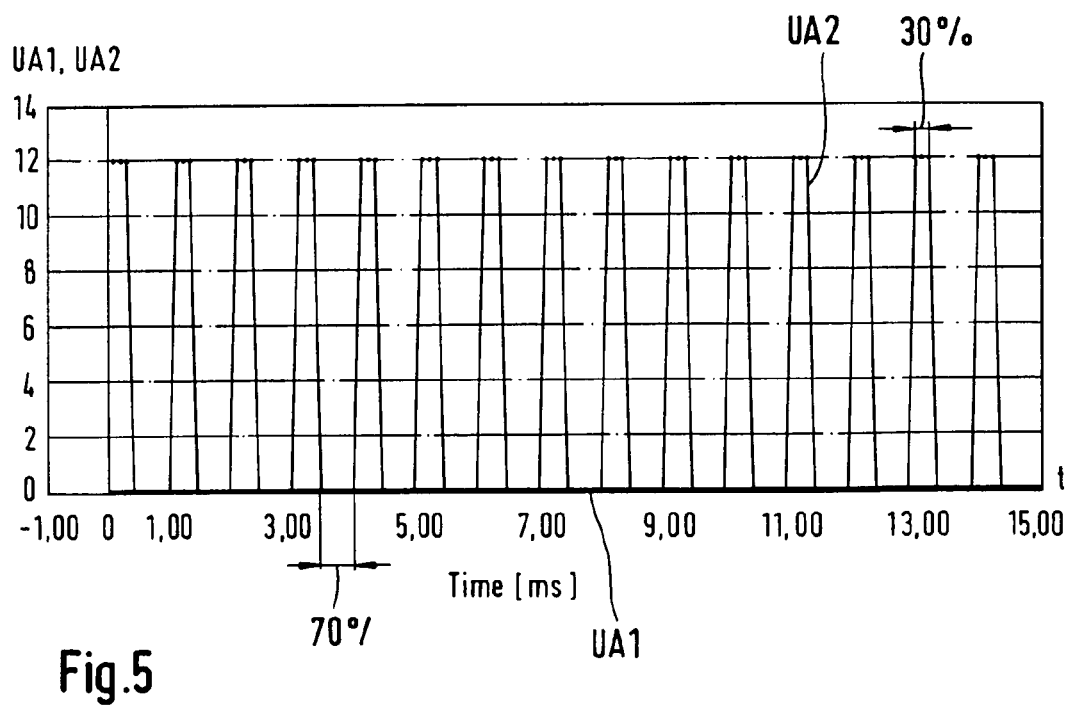

In a conventional drive of the control circuit 1 by the control unit 70, the first input (80, 85) is set to "low" by the control unit 70; that is, a control signal is applied to the second input terminal 85 for switching the second controlled switch 25 to be continuously conductive. No signal is present at the first input terminal 80 so that the first controlled switch 20 is continuously blocked. In this way, a first output signal UA1=0 results at the first output 5 as shown in FIG. 5. The first output 5 is thereby likewise "low". The second input (90, 95) is driven by the control unit 70 at a drive contact rate of 30%. The first input (90, 95) is switched to "high" during the drive pulses, that is, a drive signal for switching the third controlled switch 30 to be conductive is present at the third input terminal 90, while no control signal is present at the fourth input terminal 95 so that the fourth controlled switch 35 blocks. During the pulse pauses, the second input (90, 95) is correspondingly switched to "low" so that no control signal is present at the first input terminal 90 so that the third controlled switch 30 blocks. A control signal is then present at the fourth input terminal 95 which switches the fourth controlled switch 35 to be conductive. In this way, a second output signal UA2 results at the second output 10. The output signal UA2 essentially corresponds to the logic state at the second input (90, 95) and has the desired drive contact rate of 30%. The difference between the second output signal UA2 and the first output signal UA1 then yields the pregiven drive voltage UA according to FIG. 4.

In this conventional drive, all losses occur at the second controllable switch means (30, 35) while, in contrast, no switch operations take place at the first controllable switch means (20, 25). The heat, which is generated by the switch operations, is thereby not uniformly distributed to both controllable switch means of the control circuit 1. The second controllable switch means (30, 35) therefore generate more power loss than the first controllable switch means (20, 25).

The logic switch states at the two inputs (80, 85; 90, 95) of the control circuit 1 are generated by the processor 75 of the control unit 70.

According to the invention, the processor 75 is so adjusted that the first input (80, 85) as well as also the second input (90, 95) are driven in a clocked manner. In both cases, the clock frequency is 500 Hz, that is, period duration is 2 ms. The first input (80, 85) is driven at a drive contact rate of 35%. The ratio between pulse and pulse pause thereby is 35 to 65. The first input (80, 85) is switched to "high" for generating the pulses. A control signal is present at the first input terminal 80 and this control signal switches the first controlled switch 20 through and, in this way, connects the first output 5 to the operating voltage potential 40. The second input terminal 85 then has no switch signal so that the second controlled switch 25 is blocked. During the pulse pauses, the first input (80, 85) is at "low". No control signal is then present at the first input terminal 80 so that the first controlled switch 20 is blocked. A control signal is then present at the second input terminal 85 so that the second controlled switch 25 is switched through and the first output 5 is connected to the reference potential 45.

The second input (90, 95) is driven in this embodiment at a second drive contact rate of 65% by the processor 75. The ratio between pulse and pulse pause is then 65 to 35. During the pulses, the second input (90, 95) is at "high". A control signal is present at the third input terminal 90 and this drive signal switches the third controlled switch 30 through and thereby connects the second output 10 to the operating voltage potential 40. Then no switch signal is present at the fourth input terminal 95 so that the fourth controlled switch 35 is blocked. During the pulse pauses, the second input (90, 95) is at "low". No control signal is present at the third input terminal 90 so that the third controlled switch 30 is blocked. A control signal is then present at the fourth input terminal 95 and this control signal switches the fourth controlled switch 35 through and connects the second output 10 to the reference potential 45.

The two inputs (80, 85; 90, 95) are driven synchronously by the processor 75 in such a manner that the symmetry axes of the pulses and pulse pauses at the first input (80, 85) are coincident with the symmetry axes of the pulses and pulse pauses at the second input (90, 95).

Figure 2:
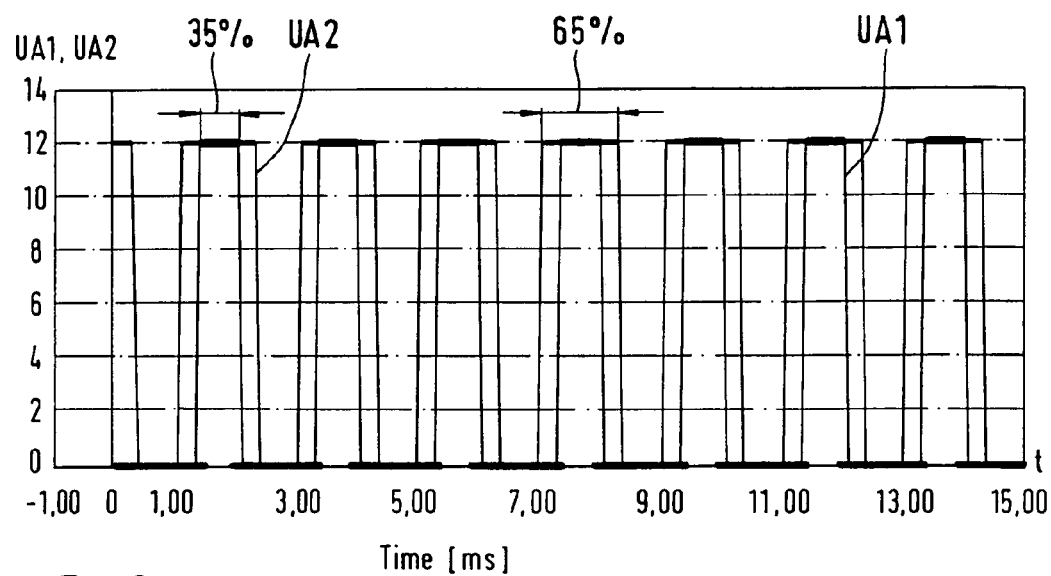
FIG. 2 shows a signal trace at the outputs of the control circuit in accordance with a first embodiment.

The first output signal UA1 results at the first input 5 with the frequency 500 Hz and the drive contact rate of 35% in correspondence to the drive signal at the first input (80, 85). In correspondence to the drive signals at the second input (90, 95), the second output UA2 having the frequency of 500 Hz and the drive contact rate of 65% results at the second output 10. The two output signals (UA1, UA2) also have the coincident symmetry axes described for the input signals. The two output signals (UA1, UA2) are shown in the signal diagram of FIG. 2. If one forms the difference (UA2–UA1) from the two periodic output signals (UA1, UA2), then the drive voltage UA (which is shown in FIG. 4) results at a frequency of 1 kHz and the drive contact rate of 30%. With this first embodiment of the invention, both controllable switch means (20, 25; 30, 35) are alternately switched so that the generated power loss and therefore the heat is distributed over both switchable switch means (20, 25; 30, 35), even over all controlled switches (20, 25; 30, 35). When the switch times for both controllable switch means (20, 25; 30, 35) are identical, then the same power loss is generated in both controllable switch means (20, 25; 30, 35). When the switch times of the four controlled switches (20, 25; 30, 35) are identical, then all four controlled switches (20, 25; 30, 35) generate the same power loss.

According to a second embodiment, the processor 75 is so set that it generates a drive signal with a drive contact rate of 70% and a frequency of 1 kHz at the first input (80, 85). This drive signal for the first input (80, 85) is generated by the processor 75 in a first operating mode. In this first operating mode, the second input (90, 95) is continuously held at "high". In this way, the first output signal UA1 having a drive contact rate of 70% results at the first input 5 corresponding to the drive signal at the first input (80, 85) while, in contrast, the second output signal UA2 at the second output 10 lies continuously at "high". In the difference (UA2–UA1) of the two output signals (UA1, UA2), there results again the pregiven drive voltage UA having a drive contact rate of 30% and a frequency of 1 kHz. In a second operating mode, the processor 75 generates a drive signal at the second input (90, 95) which has a drive contact rate of 30% with a frequency of 1 kHz. At the same time, the first input (80, 85) is set to "low". This second operating mode corresponds to the above-described conventional operation of the control circuit 1. Correspondingly, the first output signal UA1=0 results at the first output 5, that is, the first output signal UA1 likewise has the level "low". The second output 10 has the second output signal UA2 corresponding to the drive signal at the second input (90, 95) and has a drive contact rate of 30% at a frequency of 1 kHz. The difference (UA2–UA1) then leads again to the pregiven drive voltage UA according to FIG. 4 having a drive contact rate of 30% and a frequency of 1 kHz.

In the first operating mode, switching operations take place only at the first controllable switch means (20, 25) while, in contrast, switching operations take place only at the second controllable switch means (30, 35) during the second operating mode.

Figure 3:
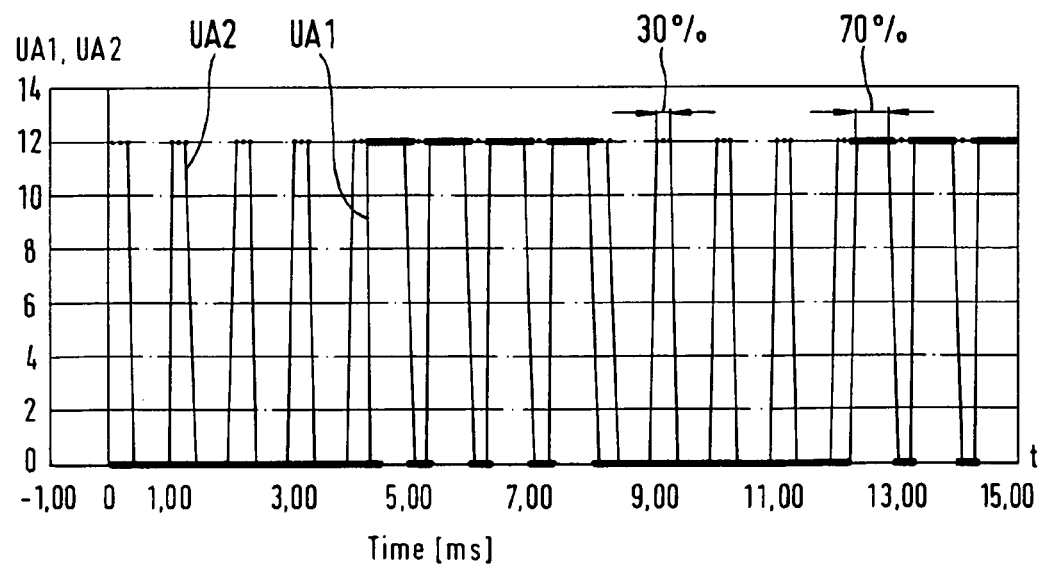
FIG. 3 shows a signal trace at the outputs of the control circuit in accordance with a second embodiment.

In the second embodiment, it is provided that the software program 100 switches over the processor 75 periodically between the two operating modes as shown in FIG. 3. According to FIG. 3, a switchover between the two operating modes occurs after four period durations. In this way, on the one hand, the pregiven drive voltage UA of FIG. 4 is realized and, on the other hand, a uniform distribution of the switch operations is achieved between the two controllable switch means (20, 25; 30, 35) and therefore a uniform distribution of the power loss in the first control circuit 1. The processor 75 is relieved of load switchover of the processor 75 caused by software. Alternatively, the software processor 75 can also be so adjusted that it realizes this switchover automatically, that is, without trigger by a software program.

The above descriptions apply correspondingly to a reversal of the direction of rotation when the component 15 is configured as a direct-current motor. Then, only the roles of the two output signals (UA1, UA2) are exchanged so that the sign of the drive voltage UA is changed. Referred to the inputs (80, 85; 90, 95) of the control circuit 1, this means that the first input (80, 85) assumes the above-described function of the second input (90, 95) and is driven by the signals from the processor 75 which signals were described above for the second input (90, 95). Oppositely, the second input (90, 95) assumes in this case the above-described function of the first input (80, 85). The drive signals of the processor 75, which were provided previously for the first input (80, 85), are now provided for the second input (90, 95).

For the pregiven drive voltage UA, another drive contact rate than 30% or another frequency than 1 kHz can be provided. The drive contact rates at the two inputs (80, 85; 90, 95) would then have to be correspondingly adapted. The clock frequency of the controlled switches (20, 25; 30, 35) is increased with increasing drive clock frequency and more power loss is produced so that the uniform distribution of power loss in accordance with the invention becomes more important with increasing clock frequency for a good removal of heat. This applies, primarily, to drive clock frequencies >5 kHz for the drive voltage UA. The distribution of the generated power loss in accordance with the invention is realized in the described manner by switching more than one of the controllable switch means (20, 25; 30, 35).

It is understood that the foregoing description is that of the preferred embodiments of the invention and that various changes and modifications may be made thereto without departing from the spirit and scope of the invention as defined in the appended claims.

What is claimed is:

1. A method of driving a control circuit including first and second outputs via which a component defining a dc load is driven, the method comprising the steps of:

selectively connecting each of said outputs to one of at least two potentials via a controllable plurality of switch devices;

forming a dc drive voltage (UA) for said component from a difference between said potentials at said first and second outputs;

adjusting a predetermined clocked waveform of said drive voltage (UA) by switching more than one of said switch devices;

driving said switch devices so as to cause a switching operation to take place only in a first number of said switch devices in a first operating mode accompanied by a first power loss in said first number of said switch devices;

driving said switch devices in a second operating mode so as to cause a switching operation to take place only in a second number of said switch devices accompanied by a second power loss in said second number of switch devices; and, during a time of supplying said dc drive voltage continuously as a constant dc drive voltage while not reversing polarity, periodically switching over between said first and second operating modes so that, alternately, at one of said outputs, a periodically clocked signal is generated and, simultaneously, at the other one of said outputs, a constant signal is generated so as to continuously form said constant dc drive voltage (UA) across said outputs to supply said dc load while simultaneously causing said first and second power losses to be equal.

2. The method of claim 1, comprising the further step of alternatingly connecting said outputs to one of said two potentials via said switch devices.

3. The method of claim 2, wherein said potentials are an operating voltage potential and a reference potential, respectively.

4. The method of claim 2, wherein said first output is connected to one of said potentials via a first one of said switch devices and said second output is connected to one of said potentials.

5. The method of claim 1, comprising the further step of driving said switch devices periodically at the same frequency so that a periodic signal having said frequency is generated at said first and second outputs.

6. The method of claim 1, comprising the further step of driving said switch devices in such a manner that a periodic signal is generated at said first and second outputs simultaneously.

7. The method of claim 1, comprising the further step of providing a control unit having first and second outputs connected to said control circuit; and, generating a switching signal on each of said first and second outputs of said control unit for switching said controllable plurality of switch devices.

8. The method of claim 1, wherein said component is a component of a motor vehicle.

9. A control unit for driving a control circuit, the control circuit including:

first and second outputs via which a component defining a dc load is driven;

first and second potentials;

a plurality of switch means for selectively connecting each of said first and second outputs to one of said first and second potentials;

means for connecting said component to said first and second outputs so as to cause a dc drive voltage (UA) for said component to result from a difference of said potentials at said first and second outputs;

said control unit comprising: generating means for generating control signals for switching more than one of said switch means with said control signals being dependent upon a predetermined clocked waveform of said dc drive voltage (UA);

said generating means including:

first means for driving said switch devices so as to cause a switching operation to take place only in a first number of said switch devices in a first operating mode accompanied by a first power loss in said first number of said switch devices;

second means for driving said switch devices in a second operating mode so as to cause a switching operation to take place only in a second number of said switch devices accompanied by a second power loss in said second number of switch devices; and, third means for periodically switching over between said first and second operating modes during a time of supplying said dc drive voltage continuously as a constant dc drive voltage while not reversing polarity so that, alternately, at one of said outputs, a periodically clocked signal is generated and, simultaneously, at the other one of said outputs, a constant signal is generated so as to continuously form said constant dc drive voltage (UA) across said outputs to supply said dc load while simultaneously causing said first and second power losses to be equal.

10. The control unit of claim 9, further comprising:

a first output for driving a first one of said plurality of switch means of said control circuit;

said first output of said control circuit being capable of connecting to one of said two potentials via said first switch means;

a second output for driving a second one of said plurality of switch means of said control circuit; and, said second output of said control circuit being capable of connecting to one of said two potentials via said second switch means.

11. The control unit of claim 10, further comprising: means for applying switch signals to both of said first and second outputs of said control unit for switching over said first and second switch means in order to generate said pregiven clocked course of said do drive voltage (UA).

12. The control unit of claim 11, wherein said switch signals are applied simultaneously periodically.

13. The control unit of claim 9, wherein said component is a component of a motor vehicle.

14. A method of driving a control circuit including first and second outputs via which a component is driven, the method comprising the steps of:

selectively connecting each of said outputs to one of at least two potentials via a controllable plurality of switch devices;

forming a drive voltage (UA) for said component from a difference between said potentials at said first and second outputs;

adjusting a predetermined clocked waveform of said drive voltage (UA) by switching more than one of said switch devices;

driving said switch devices so as to cause a switching operation to take place only in a first number of said switch devices in a first operating mode;

driving said switch devices in a second operating mode so as to cause a switching operation to take place only in a second number of said switch devices; and, during a time of supplying said drive voltage continuously as a constant drive voltage while not reversing polarity, periodically switching over between said first and second operating modes so that, alternately, at one of said outputs, a periodically clocked signal is generated and, simultaneously, at the other one of said outputs, a constant signal is generated with said drive voltage (UA) being the same for both of said first and second operating modes wherein said component continuously defines a constant dc load.

15. A control unit for driving a control circuit, the control circuit including:

first and second outputs via which a component is driven;

first and second potentials;

a plurality of switch means for selectively connecting each of said first and second outputs to one of said first and second potentials;

means for connecting said component to said first and second outputs so as to cause a drive voltage (UA) for said component to result from a difference of said potentials at said first and second outputs;

said control unit comprising: generating means for generating control signals for switching more than one of said switch means with said control signals being dependent upon a predetermined clocked waveform of said drive voltage (UA);

said generating means including:

first means for driving said switch devices so as to cause a switching operation to take place only in a first number of said switch devices in a first operating mode;

second means for driving said switch devices in a second operating mode so as to cause a switching operation to take place only in a second number of said switch devices; and, third means for periodically switching over between said first and second operating modes during a time of supplying said drive voltage continuously as a constant drive voltage while not reversing polarity so that, alternately, at one of said outputs, a periodically clocked signal is generated and, simultaneously, at the other one of said outputs, a constant signal is generated with said drive voltage (UA) being the same for both of said first and second operating modes wherein said component continuously defines a constant dc load.

16. The method of claim 1, wherein said dc drive voltage (UA) for said component is a constant dc drive voltage (UA).

17. The control unit of claim 9, wherein said dc drive voltage (UA) for said component is a constant dc drive voltage (UA).

* * * * *